Aug. 25, 1970  R. G. JACKSON  3,525,661

THERMAL INSULATION STRUCTURES

Filed April 19, 1966

INVENTOR

Robert Glover Jackson

BY

ATTORNEY

United States Patent Office 3,525,661
Patented Aug. 25, 1970

3,525,661
THERMAL INSULATION STRUCTURES
Robert Glover Jackson, Hornchurch, England, assignor to Conch International Methane Limited, Nassau, Bahamas, a company of the Bahamas
Filed Apr. 19, 1966, Ser. No. 543,726
Claims priority, application United Kingdom, June 28, 1965, 27,252/65
27,252/65
Int. Cl. B32b 3/12; E04b 1/76
U.S. Cl. 161—37                    1 Claim

ABSTRACT OF THE DISCLOSURE

A thermal insulation structure for the walls of tanks used to contain cryogenic liquids is disclosed which utilizes sandwich-type insulating panels edge-joined at seam lines to form a wall structure; two contiguous layers of such panels are provided with the seam lines of each layer covered by an insulating area of the other layer. The individual panels are also edge-stepped to provide edge areas of reduced thickness into which the corresponding central areas of greater thickness of the contiguous other layer of panels are fitted.

---

Figure 1:
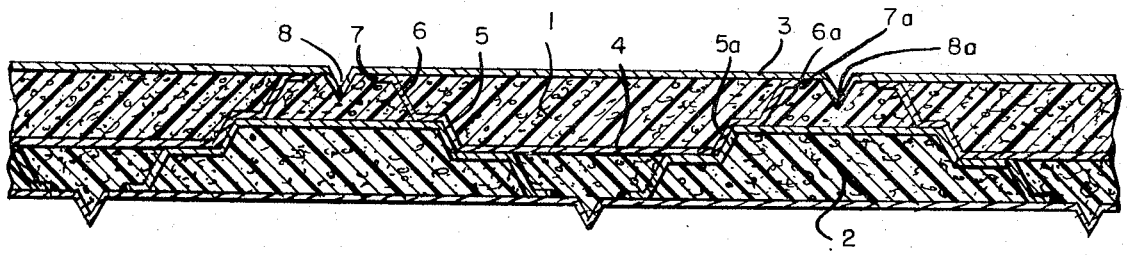

This invention relates to a thermal insulation structure which is suitable for instance for forming the walls of tanks for storing liquefied gases.

In the provision of thermal insulation structures suitable for forming the walls of tanks or containers for storing liquefied gases the dual necessity for ensuring the highest standard of insulation and a means for relieving thermal stresses when a wall is subject to great thermal change involves requirements which are difficult to meet without arrangements which are most costly to fabricate and install. Prior proposals to deal with this problem have therefore tended to some sacrifice either on the thermal insulation side or on the capacity to relieve thermal stresses or perhaps on both.

According to the present invention a thermal insulation structure comprises a series of panels as hereinafter specified spaced adjacent to one another so as to cover a surface to be insulated, an elongated face on each panel being fixed to an elongated face of an adjacent panel or panels along abutting edges and a further series of panels as hereinafter specified being so disposed as to cover the said fastened abutting edges, an elongated face of each of said further panels being fixed to an elongated face of an adjacent panel or panels along their abutting edges.

Such a thermal insulation structure is most suitable as an insulation lining for a surface and for forming a wall or walls of a container for the storage of a liquefied gas, such, for example, as marine tanks as shown in U.S. Pat. No. 3,184,094 to French et al., although the invention is also suitable for fixed storage tanks on land.

The term "panel" as used above and throughout the description and claims comprises sheet material adapted and arranged to form the front and rear faces, at least one of which is elongated, and side walls of an evacuated container carrying load-bearing insulation.

The two series of panels need not necessarily be identical but should preferably complementarily engage each other through a system of grooves, troughs or depressions resulting from the panels of at least one series having a reduced thickness in the vicinity of their fastened edges.

Where a plane surface is to be lined or insulated the panels of at least one series may be reduced in thickness in the vicinity of their abutting edges so as to form a series of tray-like grooves, depressions or troughs which troughs or depressions are substantially occupied by the raised portions of the further series of panels. These tray-like troughs or depressions may have side walls disposed substantially normal to the surface to be lined or insulated, or inclined at an angle to the normal. Again, they may be rounded, curving outwardly from the base of the tray with the edges of the walls being flattened out in a direction parallel to and away from the said base. The two series of panels may be spaced a little apart from one another or may be in physical contact at some point or points of their adjacent faces. Where the two series of panels are so disposed in relation to each other as to leave intervening hollow spaces, these may if desired be filled with thermal insulation material as, for instance, fibreglass.

The load-bearing insulation contained within the insulated panels may consist of fibreglass and the fibres thereof may lie in substantially parallel planes extending in the general direction of the elongated surface, in which planes the fibres are randomly oriented. Alternatively, such insulation material may have an open cell structure and may for instance consist of an open cell rigid plastic such as a foamed polystyrene, foamed polyvinylchloride or foamed polyurethane.

The panels may be constructed from sheet material which may be of metal, metal alloys or plastic and which is preferably suitable for use in conditions of extreme cold without loss of physical properties. Metal or metal alloy sheets such as aluminum, stainless steel, nickel steel or Invar, are preferred because they may combine both strength and flexibility with ready availability either as plane sheets or in the form of stampings. Moreover, such sheets may be easily assembled to form panels and such panels assembled to a series for instance by welding operations.

The panels may be constructed in any desired shape which in some measure is governed by the nature of the surface to be lined by the thermal insulation structure. In the case of plane surfaces simple shapes such as rectangular or square panels are preferred to facilitate and simplify the fastening of abutting edges of adjacent panels.

The panels may be formed from sheets which are themselves designed to offer some relief to thermal stress by the provision of dimples, undulations and so on. Where necessary a sheet or sheets will have been formed by stamping to yield the desired contours and of course prior to fastening the edges the appropriate load-bearing insulation is inserted in the space between the superimposed sheets, of which one is provided with a sealable orifice to facilitate evacuation. The sheets forming a given panel may be united by any conventional means but, particularly when metal sheets are involved, union by means of seam welding operations may be found most satisfactory.

Fastening of adjacent panels may be of any conventional means and may involve the use of sealing strips. Advantageously, the edges are fusion welded so as to provide an expansion joint to relieve thermal stresses on the structure. To this end each edge may be up-turned from the plane of the sheet prior to welding.

The thermal insulation structures of the present invention can very suitably be employed in the construction of thermally insulated tanks for the marine transportation of very cold liquids such as liquefied methane.

Figure 2:
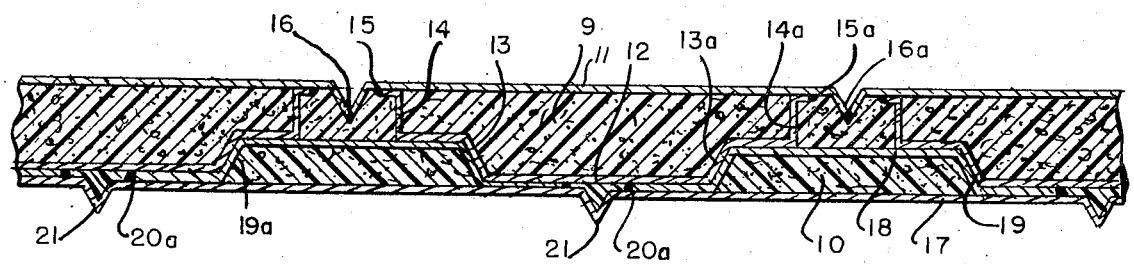
Figure 3:
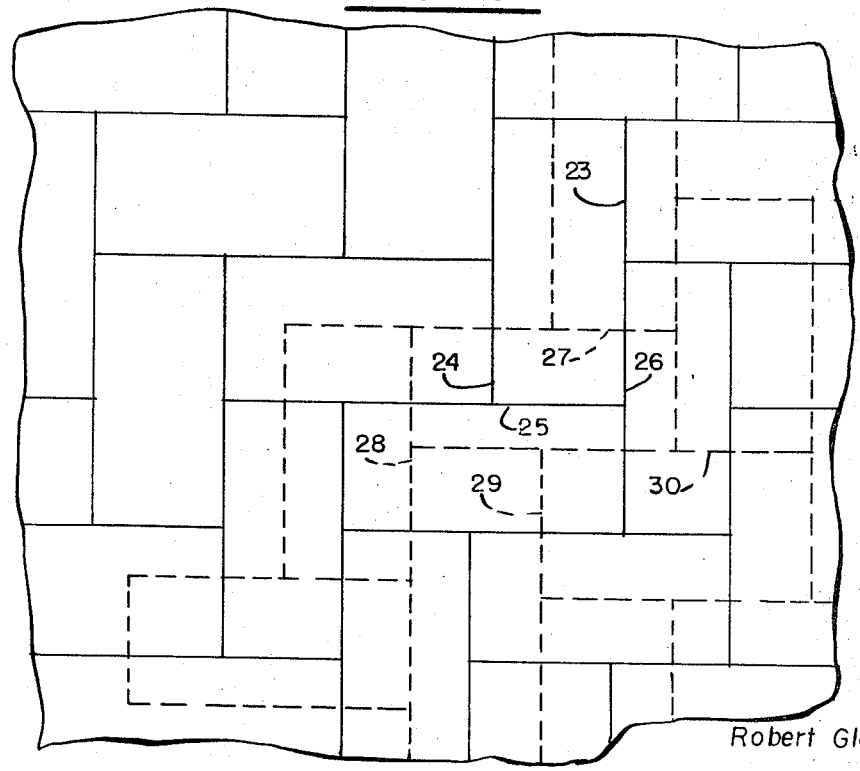

The invention will now be described and illustrated by reference to the accompanying drawings wherein FIGS. 1 and 2 show in cross section part of two alternative structures comprising two series of panels constructed in accordance with the present invention. FIG. 3 shows in plan a possible arrangement of panels forming a structure which might serve as a wall or lining of a container.

Referring to FIG. 1, two series of similar or substantially similar stainless steel panels are designated 1 and 2, and considering an individual panel of series 1, it will be seen that it involves a plane sheet 3 welded to a sheet 4 by seam welds at 7 and 7a. Sheet 4 is stepped towards sheet 3 at 5 and 5a, where the sheet is slightly inclined to the normal to sheet 3 and these stepped portions of sheet 4 together with the corresponding portions of adjacent similar panels provide a tray-like trough into which the raised portions of the panels of the second series are adapted to form a loose fit. Sheet 4 is further stepped back at 6 and 6a to provide edges which abut on and can be seam welded to sheet 3. The latter projects beyond said weld seams and has an inturned edge abutting the equivalent portion of adjacent panels, thus providing a means whereby attachment to adjacent panels can be effected by fusion welds as at 8 and 8a. These fusion welds constructed in such manner also serve as expansion joints to relieve thermal stresses in the series caused by great thermal change. It will be seen from FIG. 1 that the panels in series 2 are constructed in manner equivalent to the panels in the series 1 and engage with the latter in the manner already set forth above.

Each of said panels is provided with a sealable orifice to facilitate evacuation of the spaces and the space enclosed by the two sheets is filled with a thermal load-bearing insulation material, as for instance fibreglass.

In FIG. 2 an alternative arrangement of stainless steel panels in accordance with the invention is shown wherein the panels of one series of panels are not in all respects similar to the panels of the other. Two series of panels are designated 9 and 10, and considering a panel of series 9, a plane sheet 11 is seam welded at 15 and 15a to a sheet 12. The latter in form is somewhat equivalent to the panels of series 1 and 2 illustrated in FIG. 1, save that at 13 and 13a the stepped portions of the sheet have rounded edges curving outwardly from the base of the tray and flattening out in a direction parallel to and away from said base. Panel 12 is provided with further stepped portions as at 14 and 14a, thereby providing edges which lie on and can be seam welded to sheet 11. The latter extends beyond the seam welds and is provided with an inturned edge which is fusion welded at 16 and 16a to an equivalent portion of the immediately adjacent panels. In the panels of series 10 a plane sheet 17 is seam welded to a sheet 18 at 20a, and this latter sheet is provided with stepped portions 19 and 19a having rounded edges which are adapted to enable the panel loosely to fit into the grooves already described in the series 9. It will be seen that the panels in series 10 have only one stepped portion in between edges which can be seam welded to sheet 17. The latter in turn is provided with an out-turned edge which can be fusion welded as at 21 to an abutting edge of an adjacent panel, thus provided an expansion joint.

It will also be understood that the hollow spaces for instance below abutting edges 8, 8a and 16, 16a in FIGS. 1 and 2 respectively, may contain load-bearing thermal insulation material such as fibreglass to improve still further the thermal insulation characteristics of the structure.

Such panels can be arranged in a wide variety of patterns which will in part be governed by the availability of sheet material and ease of fabrication; the size and shape of the surface to be covered may also contribute to the pattern or arrangement of the panels. In FIG. 3 a surface to be lined by insulating material, for instance the wall of a tank in a liquefied gas marine tanker, is formed from a series of rectangular panels these being fusion welded at their abutting edges, as at 23, 24, 25 and 26, and being also provided with grooves in the vicinity of their abutting fastened edges as illustrated in FIG. 1 or 2, which grooves are not shown in FIG. 3. Engaging in such grooves are the panels of a further series, partly indicated by dotted lines. Preferably rectangular panels are also built up by fusion welding of their abutting edges such as 27, 28, 29, and 30 and being constructed in accordance with FIG. 1 or 2 adapted to engage in grooves in the first series of panels thereby providing a lining in accordance with the present invention.

It will be evident that considerable diversity of other patterns may be envisaged and likewise the panels forming a series may vary considerably from the arrangement illustrated in FIGS. 1 and 2. Moreover, in any given series the panels need not all be identical or similar and some of such panels may in fact differ considerably from others in a series in order to provide a lining suitable for a given surface.

I claim:
1. A thermally insulating wall structure comprising
(a) a series of rigid panels,
(b) each panel formed of two thin metal sheets sealed together at all their edges but spaced from each other at their major central areas to define an enclosed slab-like structure,
(c) insulating material in the space between said sheets,
(d) said wall being made up of two similar layers of such panels,
(e) each layer comprising a series of such panels joined at abutting edges along seam lines,
(f) the two layers being displaced relative to each other so that an insulating area of a panel covers each seam line,
(g) each said panel having one face stepped adjacent the edges of the panel to provide an area of reduced thickness adjacent the edges of the panel and an area of greater thickness in the center of the panel,
(h) the stepped faces of the two layers being opposed to each other with the thicker central area of one panel in each layer fitting into the space of reduced thickness formed at the adjacent edges of two opposite panels in the other layer.

References Cited

UNITED STATES PATENTS

| | | | |
|---|---|---|---|
| 3,062,337 | 11/1962 | Zittle | 161—44 X |
| 3,150,794 | 9/1964 | Schlumberger et al. | |
| 3,224,621 | 12/1965 | Upthegrove. | |
| 3,302,358 | 2/1967 | Jackson | 52—618 X |
| 3,339,780 | 9/1967 | Forman et al. | 161—43 X |
| 3,367,492 | 2/1968 | Pratt et al. | |
| 2,306,556 | 12/1942 | Neuhaus | 52—268 X |
| 2,549,189 | 4/1951 | Gabo | 161—37 X |
| 2,736,400 | 2/1956 | Gay et al. | 165—81 |
| 3,179,549 | 4/1965 | Strong et al. | 220—10 X |
| 3,184,094 | 5/1965 | French et al. | |
| 3,339,326 | 9/1967 | Derr et al. | 161—38 X |

FOREIGN PATENTS 261,724   11/1927   Great Britian.

ROBERT F. BURNETT, Primary Examiner

W. W. SCHWARZE, Assistant Examiner

U.S. Cl. X.R.

52—408, 574; 161—43, 44, 161; 220—9